(12) United States Patent
Lundahl et al.

(10) Patent No.: US 11,978,070 B1
(45) Date of Patent: May 7, 2024

(54) SYSTEMS AND METHODS FOR COMPUTER-IMPLEMENTED SURVEYS

(71) Applicant: InsightsNow, Inc., Corvallis, OR (US)

(72) Inventors: David S. Lundahl, Corvallis, OR (US); Gregory Stucky, Corvallis, OR (US)

(73) Assignee: InsightsNow, Inc., Corvallis, OR (US)

( * ) Notice: Subject to any disclaimer, the term of this patent is extended or adjusted under 35 U.S.C. 154(b) by 138 days.

(21) Appl. No.: 16/708,748

(22) Filed: Dec. 10, 2019

Related U.S. Application Data

(60) Provisional application No. 62/777,694, filed on Dec. 10, 2018.

(51) Int. Cl.
*G06Q 30/0203* (2023.01)
*G06F 17/18* (2006.01)
*G06N 20/00* (2019.01)

(52) U.S. Cl.
CPC ......... *G06Q 30/0203* (2013.01); *G06F 17/18* (2013.01); *G06N 20/00* (2019.01)

(58) Field of Classification Search
CPC ..... G06Q 30/0203; G06N 20/00; G06F 17/18
USPC ....................................................... 705/7.32
See application file for complete search history.

(56) References Cited

U.S. PATENT DOCUMENTS

| 10,043,411 | B2 | 8/2018 | Ohme et al. | |
|---|---|---|---|---|
| 2006/0155513 | A1* | 7/2006 | Mizrahi | G06Q 30/02 702/179 |
| 2012/0259240 | A1* | 10/2012 | Llewellynn | G06Q 30/0241 600/558 |
| 2013/0060602 | A1* | 3/2013 | Rupp | G06Q 30/0242 705/7.29 |
| 2013/0224697 | A1* | 8/2013 | McCallum | G09B 7/04 434/178 |
| 2015/0302436 | A1* | 10/2015 | Reynolds | G06Q 30/0201 705/7.32 |
| 2016/0225278 | A1* | 8/2016 | Leddy | G09B 5/06 |

(Continued)

OTHER PUBLICATIONS

Using EEG-Based BCI Devices to Subliminally Probe for Private Information to Frank et al, May 30, 2017 (Year: 2017).*

*Primary Examiner* — Charles Guiliano
*Assistant Examiner* — Po Han Lee
(74) *Attorney, Agent, or Firm* — MUGHAL GAUDRY & FRANKLIN PC

(57) ABSTRACT

A survey method may include presenting a participant with a training stimulus through a survey channel, wherein the survey channel is capable of measuring a reactive aspect of the participant's response to stimuli, measuring the reactive aspect of the participant's response to the training stimulus through the survey channel, presenting the participant with a survey stimulus through the survey channel, measuring the reactive aspect of the participant's response to the survey stimulus through the survey channel, and evaluating the reactive aspect of the participant's response to the survey stimulus based on the reactive aspect of the participant's response to the training stimulus. A computer-implemented survey method may include training a survey system to determine individual response times for individual participants in a survey, presenting survey content to the participants, monitoring the participants' responses to the survey content, and evaluating the individual participants' responses to the survey content based on the individual participants' response times.

15 Claims, 10 Drawing Sheets

(56) References Cited

U.S. PATENT DOCUMENTS

2018/0157691 A1* 6/2018 Venanzi ............ G06F 16/24522
2018/0225602 A1* 8/2018 Joi ....................... G06Q 10/063

* cited by examiner

Today we will be using a question style which monitors how fast you answer. The next set of questions will help us personalize the questions for you.

Please pick three numbers and remember which three you picked.

☐ One
☐ Two
☐ Three
☐ Four
☐ Five
☐ Six
☐ Seven
☐ Eight
☐ Nine
☐ Ten

FIG. 3

Was this one of the three numers you picked?

One

YES            No

FIG. 4

Thinking about a typical/normal breakfast at home before heading out for the day, when you are eating cereal (hot or cold), how do you feel about the following ingredient:

HONEY

OK          AVOID

| Response Matrix | AVOID | OK |
|---|---|---|
| Fast | Weight −1 | Weight +1 |
| Slow | Weight −0.5 | Weight +0.5 |

Implicit / Explicit

← 216

| Response | Questions to Ask | Answer List Option |
|---|---|---|
| Fast-Positive | Q1a | Answers 1-10 |
| Slow-Positive | Q1b and Q3 | Answers 1-5 and 11-15 |
| Slow-Negative | Q2a | Answers 1-10 |
| Fast-Negative | Q2b | Answers 1-5 |

SYSTEMS AND METHODS FOR COMPUTER-IMPLEMENTED SURVEYS

CROSS-REFERENCE TO RELATED APPLICATIONS

This application claims priority from U.S. Provisional Patent Application Ser. No. 62/777,694 filed Dec. 10, 2018 which is incorporated by reference.

COPYRIGHTS

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND

FIG. 1 illustrates a conventional technique for displaying the results of an online survey. Each point on the graph represents the response of a group of participants to an item in the survey such as a movie character, a business practice, or a food ingredient. The vertical axis represents a collective measure of the participants' response time, while the horizontal axis represents a collective measure of the participants' approval, avoidance or other substantive reaction to the item. The conventional technique for evaluating the response time is to simply calculate the average amount of time it takes for participants to respond to an item, and then apply conventional statistical analysis to data points from multiple items to make a determination as to what is considered a "fast" or "slow" response for a typical person.

The techniques illustrated in FIG. 1 have some inherent disadvantages in the way survey data is collected, processed and presented, thereby limiting the ability to provide insights into the participants' thinking. First, these techniques disregard inherent differences in response times between individual participants who may have different cognitive styles or may simply have faster or slower reflexes. Second, they disregard differences in response times between different survey channels and environments, e.g., a participant may be more focused and able to respond more quickly when using a mouse on a desktop computer in a cubicle than when pressing a touchscreen on a mobile device while surrounded by distractions. Third, the collective nature of the data and the way is it analyzed may lose much of the nuanced information that could otherwise be obtained from individual participants. Fourth, the specific manner in which the results are displayed may be difficult for some viewers to comprehend.

SUMMARY

A survey method may include presenting a participant with a training stimulus through a survey channel, wherein the survey channel is capable of measuring a reactive aspect of the participant's response to stimuli, measuring the reactive aspect of the participant's response to the training stimulus through the survey channel, presenting the participant with a survey stimulus through the survey channel, measuring the reactive aspect of the participant's response to the survey stimulus through the survey channel, and evaluating the reactive aspect of the participant's response to the survey stimulus based on the reactive aspect of the participant's response to the training stimulus.

The reactive aspect of the participant's response may include a response time. The training stimulus and the survey stimulus may include verbal questions. The verbal questions may include written questions. The training stimulus and survey stimulus may include images. The survey channel may be further capable of measuring a substantive aspect of the participant's response to stimuli.

The method may further include measuring the substantive aspect of the participant's response to the survey stimulus through the survey channel, and evaluating the substantive aspect of the participant's response to the survey stimulus based on the reactive aspect of the participant's response to the training stimulus. The reactive aspect of the participant's response may include a response time. The survey stimulus may include a verbal question, and measuring the substantive aspect of the participant's response to the survey stimulus may include recording the participant's substantive response to the verbal question. The participant's substantive response to the verbal question may include a multiple choice response.

The participant may be one of multiple participants, the survey channel may be one of one or more survey channels, wherein each survey channel is capable of measuring a reactive aspect and a substantive aspect of a participant's response to stimuli, and the method may further include: presenting the multiple participants with training stimuli through the one or more survey channels, measuring the reactive aspect of the multiple participants' responses to the training stimuli through the one or more survey channels, presenting the multiple participants with survey stimuli through the one or more survey channels, and measuring the reactive aspect and the substantive aspect of the multiple participants' responses to the survey stimuli through the one or more survey channels; and the method may further include evaluating the reactive aspect of the multiple participants' responses to the survey stimuli based on the reactive aspect of the multiple participants' responses to the training stimuli.

The method may further include aggregating the multiple participants' responses to the survey stimuli based on the reactive and substantive aspects of the responses. The method may further include applying weights to the aggregated responses. The method may further include summing the weighted responses, thereby generating a response value. The multiple participants' responses may be aggregated by dividing the responses into groups based on the reactive and substantive aspects of the responses. The groups may be based on discrete characterizations of the reactive and substantive aspects of the responses.

The reactive aspect of the responses may be characterized as fast or slow, and the substantive aspect of the responses may be characterized as positive or negative. The aggregated responses may be arranged in a two-dimensional representation, and the method may further include transforming the two-dimensional representation to a one-dimensional representation. The method may further include presenting the participant with at least one additional survey stimulus based on the reactive and substantive aspects of the participant's response to the survey stimulus. The additional survey stimulus may include one or more survey questions customized to the participant. The additional survey stimulus may include one or more survey answers customized to the participant.

A computer-implemented survey method may include training a survey system to determine individual response times for individual participants in a survey, presenting survey content to the participants, monitoring the participants' responses to the survey content, and evaluating the individual participants' responses to the survey content based on the individual participants' response times. Training the survey system may include, presenting one participant with a timed training test, monitoring the one participant's response to the timed training test, and determining a cut-off point based on the one participant's response to the timed training test.

The method may further include using the one participant's cut-off point to evaluate the one participant's responses to survey content. The method may further include using the one participant's cut-off point to evaluate other similarly situated participants' responses to survey content. Training the survey system may further include presenting multiple participants with a timed training test, monitoring the multiple participants' responses to the timed training test, and determining cut-off points for the multiple participants based on the multiple participants' responses to the timed training test. The method may further include re-training the survey system in response to a change in a survey environment. The timed training test may include a task and one or more follow-up questions based on the task.

Evaluating the individual participants' responses to the survey content based on the individual participants' response times may include categorizing the responses into one or more groups. The method may further include applying one or more weights to responses in one or more of the groups. The method may further include summing the weighted responses from the one or more cells to calculate a response value. The method may further include changing one or more of the weights based on an objective of the survey. One or more of the weights may be determined dynamically at least in part by participants' previous responses to the survey content. One or more of the weights may be determined dynamically at least in part by purchase probabilities based on participants' previous responses to the survey content. Each of the one or more groups may include a cell in a matrix. The method may further include transforming the responses in the cells to a one-axis visualization. The method may further include providing customized survey content to individual participants in response to evaluating the individual participants' responses. The customized survey content includes one or more custom questions and corresponding answer options.

A computer-implemented survey method may include categorizing survey responses into cells in a matrix, and applying a weight to responses in one or more of the cells. The method may further include summing weighted responses from the one or more cells, thereby calculating a response value. A computer-implemented survey method may include categorizing survey responses into cells in a matrix having two or more axes, and transforming the responses from the cells to a one-axis visualization.

A survey system may include a survey platform having a processor configured to: train the survey system to determine individual response times for individual participants in a survey, present survey content to the participants, monitor the participants' responses to the survey content, and evaluate the individual participants' responses to the survey content based on the individual participants' response times. The processor may be further configured to train the survey system by: presenting one participant with a timed training test, monitoring the one participant's response to the timed training test, and determining a cut-off point based on the one participant's response to the timed training test.

A survey system may include a survey platform having a processor configured to: present a participant with a training stimulus through a survey channel, wherein the survey channel is capable of measuring a reactive aspect of the participant's response to stimuli, measure the reactive aspect of the participant's response to the training stimulus through the survey channel, present the participant with a survey stimulus through the survey channel, measure the reactive aspect of the participant's response to the survey stimulus through the survey channel, and evaluate the reactive aspect of the participant's response to the survey stimulus based on the reactive aspect of the participant's response to the training stimulus.

BRIEF DESCRIPTION OF THE DRAWINGS

FIG. 3 illustrates a first part of a timed trainer test according to some inventive principles of this patent disclosure.

FIG. 4 illustrates a second part of a timed trainer test according to some inventive principles of this patent disclosure.

FIG. 12 illustrates another example embodiment of a response matrix and table illustrating how customized survey questions and/or answer sets may be provided to a participant according to some inventive principles of this patent disclosure.

DETAILED DESCRIPTION

Figure 2:
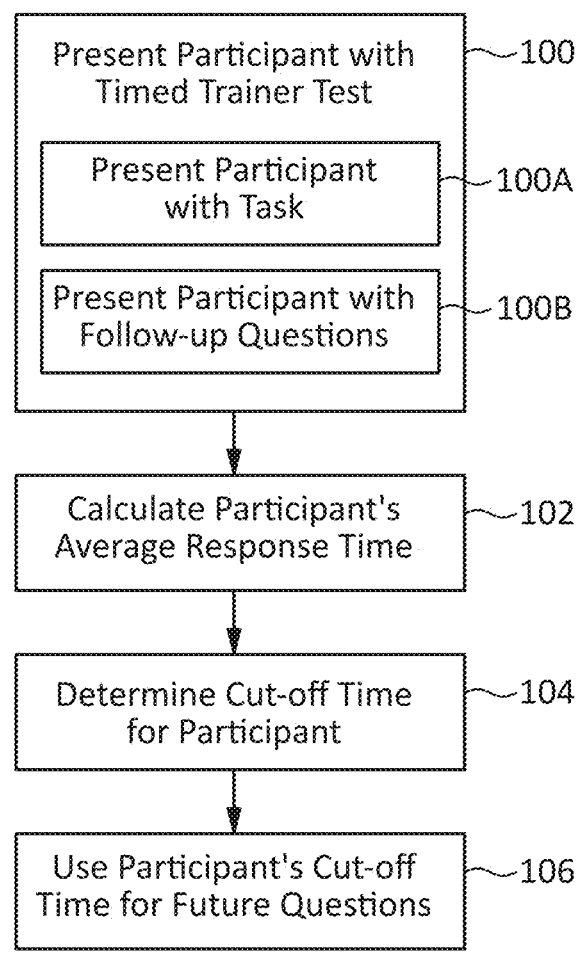
FIG. 2 illustrates a method for training a computer-implemented survey system to accommodate differences in the response times of individual participants according to some of the inventive principles of this patent disclosure.

FIG. 2 illustrates a method for training a computer-implemented survey system to accommodate differences in the response times of individual participants according to some of the inventive principles of this patent disclosure. The method begins at step 100 where the system presents a participant with a timed trainer test where all responses are known to be "fast." Step 100 may be a single-part test, or it may have one or more sub steps. For example, the timed trainer test may have a first part 100A where the participant is presented with a task such as picking a group of numbers as shown in FIG. 3, and a second part 100B where the participant is presented with one or more follow-up questions as shown in FIG. 4. In the example of FIG. 4, the system may cycle through the same question for each of the group of numbers, presented randomly, each time recording the participant's response time. In another embodiment, the first part may include asking the participant to select the three colors they like best from a list of ten colors. In the second part, the system may then cycle through all ten colors, again presented randomly, each time asking the participant if the color is one of the ones they selected, and recording the participant's response time. Other examples of timed trainer tests include tests based on other symbols or patterns.

At step 102, the system calculates an average or other statistical measure of the participant's response time and at step 104 determines a threshold value or other suitable parameter for evaluating the personalized response time for the participant. For example, the 90th percentile of a participant's average response time may be used as the cutoff for a "fast" response for that participant. At step 106, the system uses the threshold value or other parameter as the basis for determining the participant's response time for further questions in the survey.

The training process illustrated in FIG. 2 may be repeated for each participant, or for a group of similarly situated participants. It may also be repeated to provide a new measure of "fast" when there is a change in the survey environment, for example, a change in the survey channel (mobile, desktop, kiosk, telephone, etc.), the survey content, the time of day, or any other factor which may affect the participant's response time.

The inventive principles relating to personalized response times may provide more accurate and/or insightful survey results. They may also provide an improved basis for comparing survey results from different groups of participants who complete surveys under greatly different conditions including participating in surveys through different channels such as desktop browsers, mobile apps, telephone, and other channels as described below.

Figure 1:
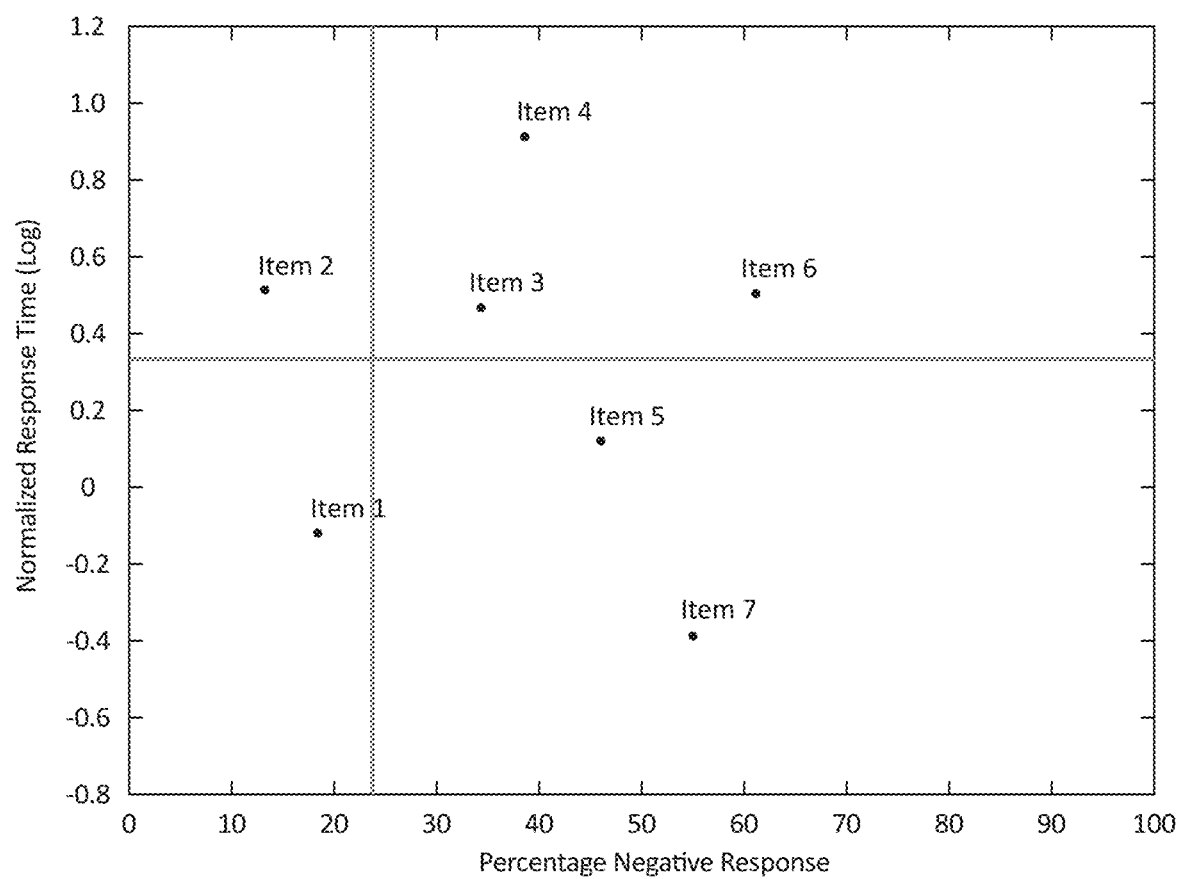
FIG. 1 illustrates a conventional technique for displaying the results of an online survey.
Figures 5, 6:
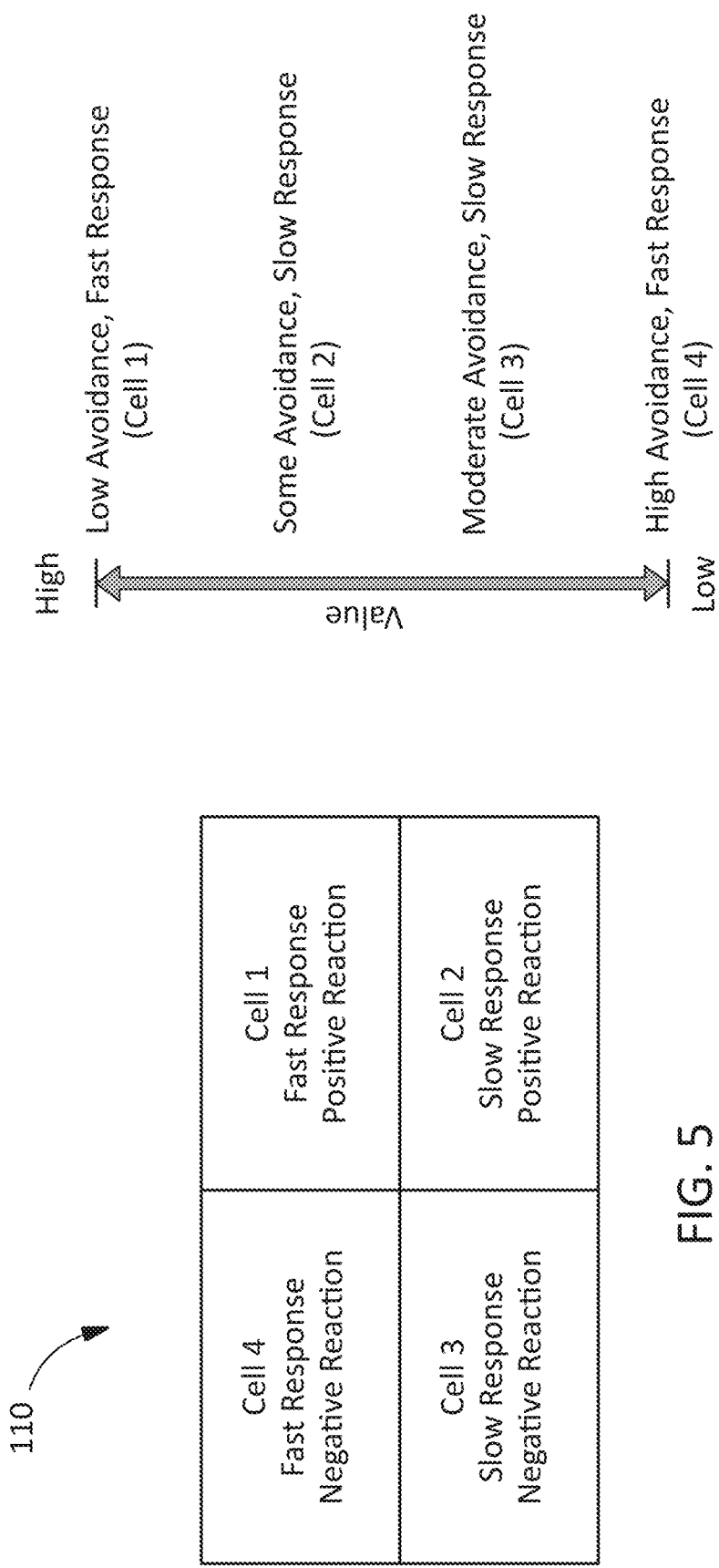
FIG. 5 illustrates an embodiment of a response matrix for categorizing, and facilitating further processing of, survey responses according to some inventive principles of this patent disclosure.
FIG. 6 illustrates a one-axis representation obtained by transforming data from the response matrix of FIG. 5 according to some inventive principles of this patent disclosure.

FIG. 5 illustrates an embodiment of a response matrix for characterizing, categorizing, and/or facilitating further processing of, survey responses according to some inventive principles of this patent disclosure. The matrix 110 of FIG. 5 is arranged along two-axes, but unlike the graph of FIG. 1, each axis of the matrix 110 represents a discrete (e.g., binary) categorization rather than a continuous scale. Moreover, the matrix 110 may be transformed to a one-axis representation as show in FIG. 6 and explained in more detail below.

Referring again to FIG. 5, a fast response that includes a positive reaction is categorized into cell 1, a slow response with a positive reaction is categorized in cell 2, a slow, negative response is categorized in cell 3, and a fast, negative response is categorized in cell 4.

Responses that fall into the top row of the matrix (cells 1 and 4) may be described as implicit or emotional responses because they tend to be impulsive or reflexive, i.e., based on fast thinking. Reponses that fall into the bottom row of the matrix (cells 2 and 3) may be described as explicit or reasoned responses because they tend to be based on studied thought or consideration, i.e., based on slower thinking.

Figures 7, 8:
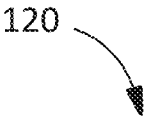
FIG. 7 illustrates another embodiment of a response matrix for categorizing, and facilitating further processing of, survey responses according to some inventive principles of this patent disclosure.
FIG. 8 illustrates an example embodiment of a survey question relating to an ingredient according to some inventive principles of this patent disclosure.

FIG. 7 illustrates another embodiment of a response matrix for categorizing, and facilitating further processing of, survey responses according to some inventive principles of this patent disclosure. The matrix 120 includes four cells arranged in the same manner as the matrix 110 of FIG. 5, but the matrix 120 of FIG. 7 includes weights that are assigned to the responses that fall into each cell. In this example, cells 1, 2, 3 and 4 are assigned weights of +1, +0.5, −0.5 and −1, respectively, but other weights may be used. These weights may be used to transform the results from the two-axis matrix 120 to a one-axis value that can be visualized as shown in FIG. 6. For example, the following equation (Eq. 1) may be used to calculate a value based on the results categorized into each of the four cells:

$$\text{Value} = \left[\sum_{i=1}^{4} \frac{\text{Cell}_i \text{Weight}_i}{2}\right] + 50 \qquad (\text{Eq. 1})$$

where $\text{Cell}_i$ is the percentage of responses categorized in cell i, and $\text{Weight}_i$ is the weight assigned to cell i. Some results for various illustrative cases using Eq. 1 are shown in Table 1 below.

TABLE 1

|  | Cell 1 | Cell 2 | Cell 3 | Cell 4 | Value |
|---|---|---|---|---|---|
| "Best" Case | 100% | 0% | 0% | 0% | 100 |
| "Worst" Case | 0% | 0% | 0% | 100% | 0 |
| Uniform Case | 25% | 25% | 25% | 25% | 50 |
| Example Case | 60% | 18% | 6% | 16% | 75 |

Applying Eq. 1 to the Example Case shown in Table 1, $\text{Cell}_1$=60, $\text{Weight}_1$=1, $\text{Cell}_2$=18, $\text{Weight}_2$=0.5, $\text{Cell}_3$=6, $\text{Weight}_3$=−0.5, $\text{Cell}_4$=16, and $\text{Weight}_4$=−1. Thus, the Value for the Example Case=60/2+9/2−3/2−16/2+50 which equals 30+4.5−1.5−8+50=75. This example illustrates how applying different weights to the various cells may produce more insight into the participants' responses. In this example, the faster (more emotional or implicit) responses are weighted more heavily than the slower (more rational or explicit) responses, which is consistent with studies relating to the emotional component of human thinking and decision making.

Moreover, the values obtained for various survey items can then be placed along a single axis shown in FIG. 6 to provide a simpler visualization of survey results on a computer screen. This may be preferable in some situations because people can often comprehend information that is reduced to a single axis value or score more readily than information that requires two dimensions for visualization.

Figure 9:
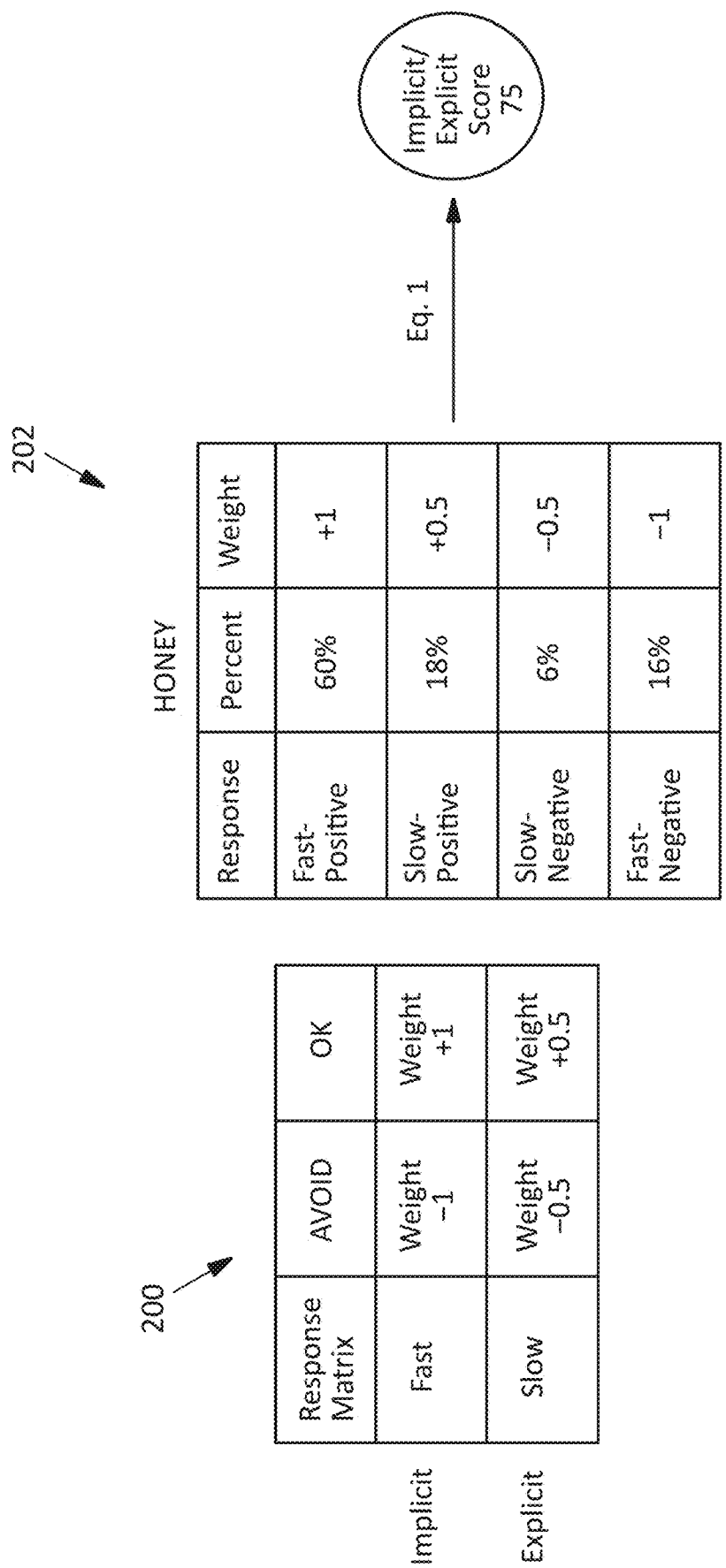
FIG. 9 illustrates an example embodiment of a response matrix and table for scoring the ingredient shown in FIG. 8 according to some inventive principles of this patent disclosure.

FIG. 8 illustrates an example embodiment of a survey question relating to an ingredient according to some inventive principles of this patent disclosure. FIG. 9 illustrates an example embodiment of a response matrix and table for scoring the ingredient shown in FIG. 8 according to some inventive principles of this patent disclosure. In this example, Honey is used as an ingredient but the inventive principles may apply to any other ingredient or attribute of any survey subject.

The response matrix 200 is similar to that of FIG. 7 but with the "Avoid" as the Negative response and "OK" as the Positive response. The individual participants' responses to the survey question of FIG. 8 may be evaluated as implicit (fast) or explicit (slow), for example, using an individualized training method such as that described above with respect to FIGS. 2-4. Thus, each response may be evaluated and placed in a group as either Fast-Positive, Slow-Positive, Slow-Negative, or Fast-Negative as shown in table 202 which lists the percentage of total responses falling into each of the four groups in the cells of the center column. The weight from each of the cells of matrix 200 are shown in a corresponding cell of table 202. The data from Table 202 may then be processed using Eq. 1 to calculate a value of 75 which, in this example, may be referred to as an Implicit/Explicit Score.

Figure 10:
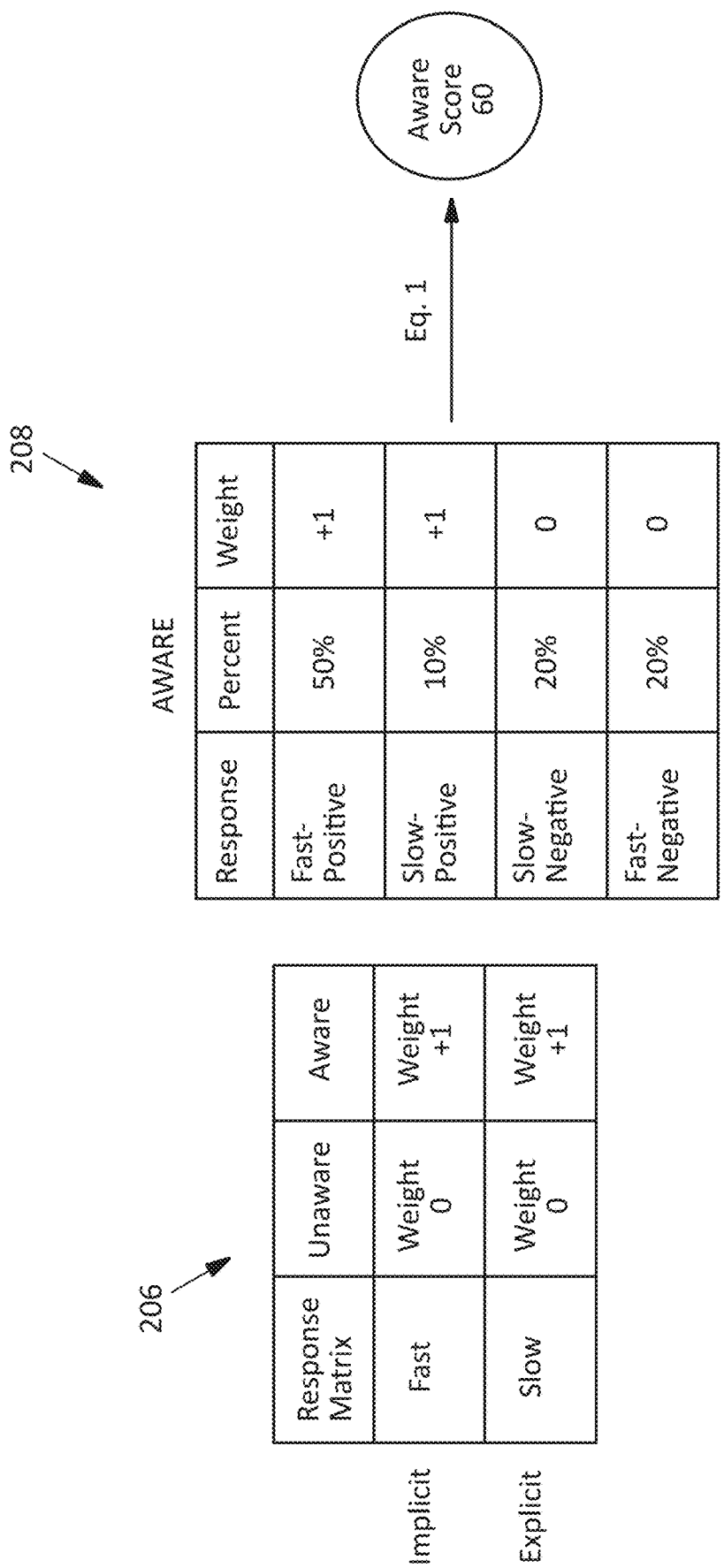
FIG. 10 illustrates another example embodiment of a response matrix and table illustrating how weights may be changed based on one or more objectives of the survey according to some inventive principles of this patent disclosure.

FIG. 10 illustrates another example embodiment of a response matrix and table according to some inventive principles of this patent disclosure. The embodiment of FIG. 10 may illustrate how the weights assigned to each group of responses, which in this example are associated with cells of response matrix 206, may be changed based on one or more objectives of the survey or portion thereof. In this example, a transformation is applied to the cells of the response matrix 206 to implement a brand awareness score. Specifically, the survey question shown in FIG. 8 may be replaced with a question regarding a brand and an answer set with options that indicate the participant is either "aware" of the brand (Positive response) or "unaware" of the brand (Negative response). The weights for responses in the "unaware" cells may be set to zero, while the weights for responses in the "aware" cells may be set to +1.

Again, the individual participants' responses to the survey question regarding brand awareness may be evaluated as implicit (fast) or explicit (slow), for example, using an individualized training method such as that described above with respect to FIGS. 2-4. Thus, each response may be evaluated and placed in a group as either Fast-Positive, Slow-Positive, Slow-Negative, or Fast-Negative as shown in table 208 which lists the percentage of total responses falling into each of the four groups in the cells of the center column. The weight from each of the cells of matrix 206 are shown in a corresponding cell of table 208. The data from Table 208 may then be processed using Eq. 1 to calculate a value of 60 which, in this example, may be referred to as an Aware Score.

Figure 11:
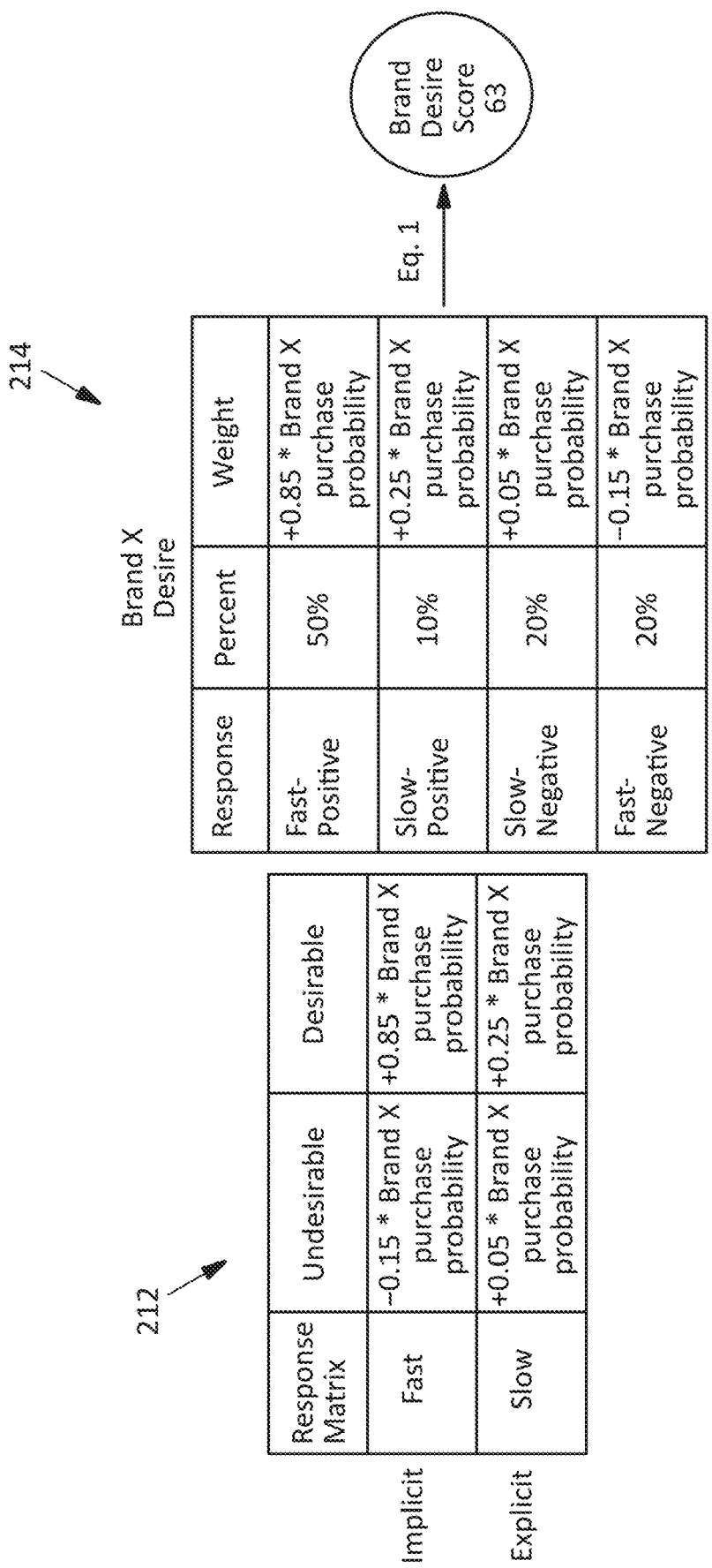
FIG. 11 illustrates another example embodiment of a response matrix and table illustrating how weights may be changed dynamically based on participants' responses to previous survey questions according to some inventive principles of this patent disclosure.

FIG. 11 illustrates another example embodiment of a response matrix and table according to some inventive principles of this patent disclosure. The embodiment of FIG. 11 may illustrate how the weights assigned to each group of responses, which in this example are associated with cells of response matrix 212, may be changed dynamically based, at least in part, on participants' responses to previous survey questions. In the example of FIG. 11, a brand awareness question, answer set and individualized training method such as that used for the embodiment of FIG. 10 may be used as a starting point, but the weights shown in the response matrix 212 may be transformed to the dynamic weights shown in the corresponding cells of the weight column in the table 214. Each of the weights in table 214 includes a fixed portion multiplied by a Brand X purchase probability (BXPP) which in this example may be a dynamic number between 0 and 1 and may be based on participants' responses to previous questions in the survey. In some embodiments, an average or overall BXPP for all participants may be used. In other embodiments, the BXPP in each cell may be an average or overall value that is specific to the group of participants who provided the specific response for that row. In other embodiments, an individual BXPP may be used for each individual participant. For purposes of illustration, assuming an overall BXPP for all participants of 0.605, the data from Table 214 may then be processed using Eq. 1 to calculate a value of 63 which, in this example, may be referred to as a Brand Desire Score.

FIG. 12 illustrates another example embodiment of a response matrix and table according to some inventive principles of this patent disclosure. The embodiment of FIG. 12 may illustrate how the transformation a participant gives to the implicit/explicit determination may be used to provide customized (personalized) survey questions and/or answer sets (lists) dynamically, i.e., in real time during a survey. That is, customized survey content such as custom questions and corresponding answer options may be provided to individual participants based on evaluating the individual participants' responses to previous questions, whether training questions or survey questions.

In the example of FIG. 12, an ingredient avoidance or acceptance question, answer set and individualized training method such as that used for the embodiment of FIG. 9 may be used as a starting point, but any other type of survey content may be used. Thus, the response matrix 216 may include "Avoid" as a Negative response and "OK" as a Positive response. However, as alternative to, or in addition to, table 202 of FIG. 9, the embodiment of FIG. 12 includes a table 218. Table 218 identifies one or more additional questions that may be presented to a group of participants based on which of the four response groups each participant belongs to. For example, a participant who provided a Fast-Positive response would be presented with Question Q1a and provided with possible answers 1-10. Likewise, participant who provided a Slow-Positive response would be presented with questions Q1b and Q3, along with possible answers 1-5 and 11-15, respectively.

In some embodiments, a participant may be presented with additional survey questions based on any aspect of the two-dimensional matrix representation. This may include questions based on reactive, and substantive aspects, positive and negative aspects, or any combination of implicit, explicit, positive, and negative responses. Additionally, a participant may be presented with at least one additional survey question based on the weighted response value from multiple questions and/or participants. For example, in some embodiments, a participant may be presented with a question based on a value which comes from the mathematical calculation of their weighted responses. Moreover, after a group of participants take a survey, one or more later participants may be presented with one or more question based on how the one or more later participants compare to the group of participants who previously took the survey.

Figure 13:
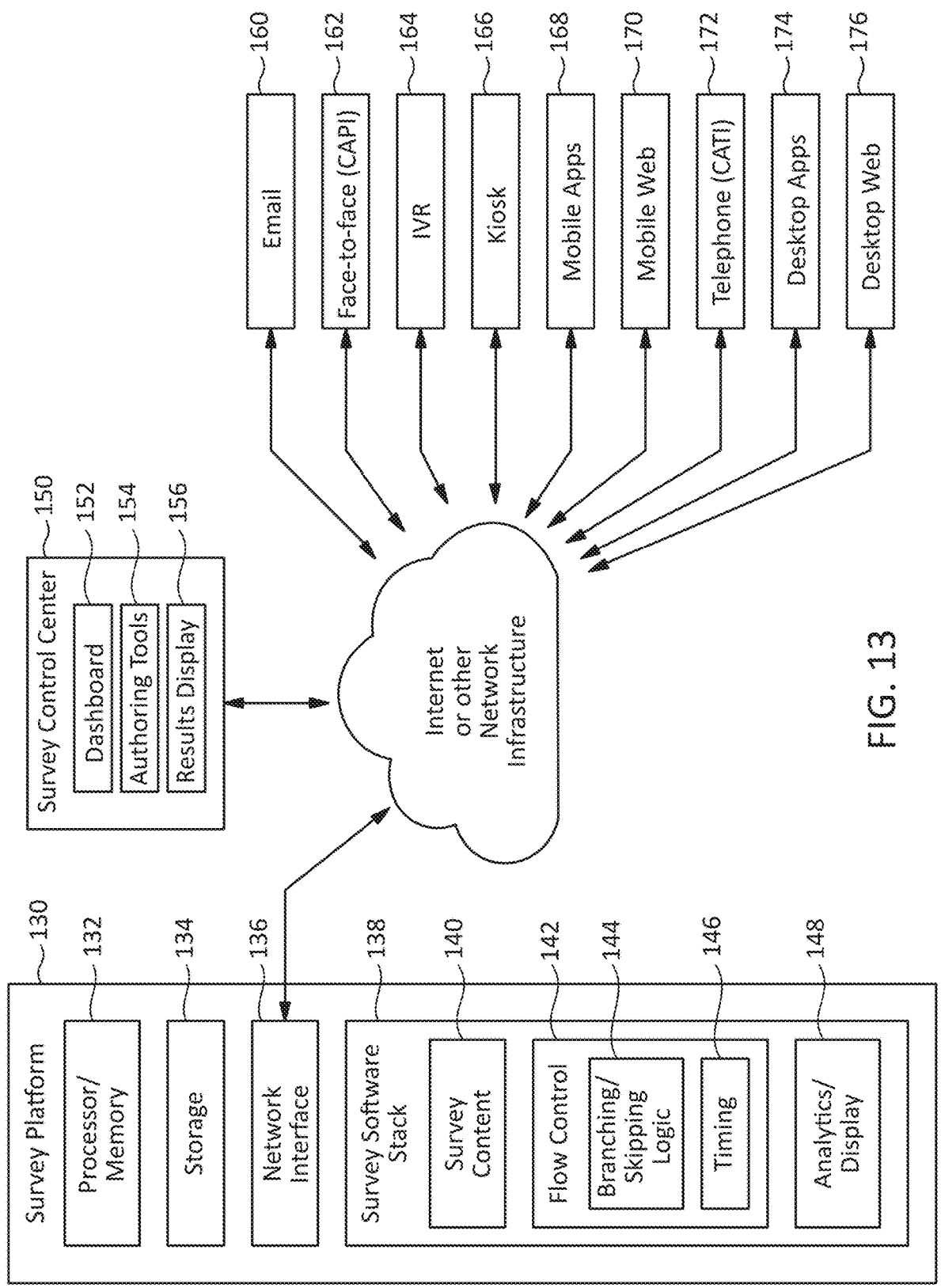
FIG. 13 illustrates an example embodiment of a system for implementing a computer-implemented survey according to some of the inventive principles of this patent disclosure.

FIG. 13 illustrates an example embodiment of a system suitable for implementing any of the methods described in this disclosure. In the example system of FIG. 8, a survey platform 130 is implemented as software as a service (SaaS) which typically runs on cloud infrastructure, but it may also be implemented with any suitable arrangement of hardware and software infrastructure. The survey platform 130 includes a processor/memory 132, data storage 134 and network interface 136. A survey software stack 138 includes various modules for implementing the functionality described in this disclosure. A survey content module 140 handles the storage and display of questions, images and any other content that forms the core of a survey. A flow control module 142 includes functionality for presenting content to survey participants. The flow control module 142 includes a logic module 144 for branching and skipping questions, and a timing module 146 for measuring, processing and recording response times. An analytics/display module 148 handles any real-time or post-survey processing of results and presents them using various reporting and visualization tools. The timing module 146 may be used to implement methods for accommodating differences in the response times of individual participants such as the methods illustrated in FIGS. 2-4 The analytics/display module 148 may be used to implement matrix and data transformation methods including the methods described with respect to FIGS. 5-7.

A Survey Control Center 150 may be implemented through a browser window connected to the Survey Platform 130 through the internet or other network infrastructure, or using any other suitable combination of hardware and software. A dashboard module 152 provides overall control of survey operations including deployment, scheduling, collecting results, etc. Authoring tools 154 enable a user to create, store and modify surveys, and a display module 156 displays survey results in the form of reports, charts, graphs and other visualization tools.

The right side of FIG. 13 illustrates some of the channels through which survey participants may interact with the system. Two of the most common channels are mobile web 170 and desktop web 176 where the participant interacts with the survey through a web browser. Another common channel is mobile apps 168 in which a participant downloads and uses a dedicated application to monitor activities and respond to survey questions. Other useful channels include email 160, fact-to-face interviews facilitated by computer assisted personal interviewing (CAPI) 162, interactive voice response (IVR) 164, kiosk operations 166, telephone surveys facilitated by computer assisted telephone interviewing (CATI) 172, and desktop applications 174.

Example of survey platforms that may be programed or adapted to operate according to the inventive principles of this patent disclosure include those operated by Confirmit and/or Askia.

For a channel to be capable of accurately measuring the speed of a survey participant's response, it typically must be able to operate faster than a human can practically operate. For example, in some embodiments, the average time for a participant to provide a fast response may be less than two seconds. Thus, to accurately, reliably, and consistently measure a participant's response times to training and survey questions, the measurement system may need to have a resolution of tenths or even hundredths of a second, which is beyond the ability of ordinary people.

Thus, in some embodiments, one or more processors such as processor 132 in FIG. 13 may be programmed or otherwise configured to measure a participant's response times to training and survey questions. Such a configuration may be used to measure response times to questions in surveys conducted through any suitable channel including those described in FIG. 13. For example, in a survey conducted through fact-to-face interviews facilitated by computer assisted personal interviewing (CAPI), a processor may be configured to measure the time between when the surveyor finishes asking a question and when the participant begins responding. Such a configuration may use, for example, voice activation/deactivation techniques to identify the beginning and end of a timing interval. Similar configurations may be used for surveys conducted through interactive voice response (IVR) and telephone surveys facilitated by computer assisted telephone interviewing (CATI).

The embodiments disclosed above have generally been described in the context of online surveys using written questions, where the participant's response time indicates whether the response may be characterized as an implicit or explicit response. However, the inventive principles may also be applicable to any survey methods and systems that are capable of measuring various aspects of a participant's response to any stimulus that may be used in a survey, including embodiments in which a human cannot practically measure one or more aspects of the response.

Stimuli, which includes both training stimuli and survey stimuli, may generally be characterized as semantic (i.e., using words or language) or non-semantic which may include images, music or any sounds other than language, scents, flavors, etc.

A survey response may generally be characterized as have at least two aspects or parts: a substantive part, and a reactive part. The substantive part may generally be thought of as the actual content of the answer, for example, the yes or no response to a binary question, or the options selected by a participant in response to a list of options. Measurement of the substantive part of a response may generally be straightforward and involve things such as recording which of various answer options have been selected, saving free-form answer questions, recording the substance of spoken survey responses during a telephone or in-person survey, etc.

The reactive part of a response may provide additional information, for example, to indicate whether the response may be characterized as implicit or explicit. The reactive part may be measured, for example, based on physical, physiological, neurophysiological, and/or other aspects of the response that may indicate whether the response is (1) primarily based on implicit factors such as habits, impulses, emotions, and/or intuitive, visceral, affective, indirect, and/or subconscious thought processes, or (2) primarily based on explicit factors such as study, analysis, contemplation and/or deliberate, rational, logical and/or conscious thought processes.

In the example embodiments described above, the reactive part may generally be measured by physically measuring the participant's response time to a written question. In other embodiments, however, the reactive part may be measured based on physiological or neurophysiological effects. Examples of such effects that may be used to measure reactive aspects of a response include biometrics (e.g., autonomic nervous system, skin conductance, heart rate, breathing, etc.), brain scans (e.g., central nervous system, EEG, fMRI, PET scans, etc.), facial expressions (e.g., facial EMG, facial coding, etc.), and pupil movements. For example, a computer-implemented survey system may include one or more processors and a camera configured to use software for facial coding recognition to record facial expression such as a smile or a grimace as a measure of the reactive aspect of the participant's response to stimulus such as a question or image.

In other embodiments, the reactive aspects of responses may be characterized as semantic such as inflection and/or loudness of spoken words, cadence of response, and the like. These reactive aspects of responses may be measured using, for example, speech recognition and/or analysis software running on the survey platform.

In other embodiments, a facial expression may be used as the substantive or reactive part of a response. For example, a facial expression such as a smile may be recorded as the substantive aspect of the response, while the amount of time it took the smile to develop may be considered the reactive aspect of the response.

The inventive principles of this patent disclosure can be modified in arrangement and detail without departing from the inventive concepts. For example, a method for determining a participant's response speed has been described in the context of examples having binary categorization, e.g., having two-values such as fast/slow, but the inventive principles also apply to systems that use more than one discrete cutoff point, e.g., fast/medium/slow, and to systems that use a speed score or rating, or even a speed that is expressed as a function of some other variable such as question complexity, time of day, etc. Moreover, survey responses, weights, and other aspects have generally been described as being divided into discrete ranges or quantities, but in other embodiments, continuous values may be used. For example, rather than having percentages of responses and/or weights divided into groups, they may be expressed as continuous functions or values. In yet other embodiments, weights may be applied to individual responses before being aggregated into groups. Such changes and modifications are considered to fall within the scope of the following claims. Moreover, the various inventive principles described herein have independent utility, but they may also be combined to provide synergistic results.

The invention claimed is:

1. A survey method to measure human response to one or more stimuli, wherein the survey method is implemented by a computer, the survey method comprising:

downloading an application on the computer, wherein the application is to monitor activities and provide a calibration stimulus;

presenting a participant, via a graphical user interface coupled to the computer, with the calibration stimulus through a survey channel comprising software, electronic hardware or a combination of them, wherein the survey channel is capable of measuring a reactive aspect of the participant's response to the calibration stimulus, wherein the survey channel is coupled to the computer, wherein the survey channel includes the application;

receiving, from a machine coupled to the computer, a first biometric information related to a human being whose human response is being measured, wherein the machine is to generate the first biometric information faster than a human awareness to the calibration stimulus via a human motor response demonstration, wherein the machine is one of an EEG machine, an fMRI machine, a PET machine, an EMG machine, or a facial recognition camera;

measuring the reactive aspect of the participant's response to the calibration stimulus through the survey channel, wherein the reactive aspect is independent of correctness of the participant's response;

storing, in an electronic memory, the reactive aspect of the participant's response to the calibration stimulus;

presenting, via the graphical user interface, the participant with a survey stimulus through the survey channel;

receiving, from the machine, a second biometric information related, wherein the machine is configured to generate the second biometric information faster than the human awareness to the survey stimulus via the human motor response demonstration;

measuring, with the computer via speed of an active human response using the computer independent of correctness of the participant's response, the reactive aspect of the participant's response to the survey stimulus through the survey channel, wherein measuring of the reactive aspect of the participant's response to the survey stimulus is based on the second biometric information, wherein the first biometric information and the second biometric information include one or more of: facial coding recognition, speech recognition, biometrics, brain scans, or pupil movements;

storing, in the electronic memory, the reactive aspect of the participant's response to the survey stimulus;

evaluating the stored reactive aspect of the participant's response to the survey stimulus based on the stored reactive aspect of the participant's response to the calibration stimulus;

measuring, with the computer, a substantive aspect of the participant's response to a plurality of calibration stimuli and/or a plurality of survey stimuli;

evaluating, with the computer, the substantive aspect of the participant's response to the plurality of survey stimuli based on the reactive aspect of the participant's response to the plurality of calibration stimuli, wherein the participant is one of multiple participants;

aggregating the multiple participants' responses to the plurality of survey stimuli based on the reactive and substantive aspects of the responses, wherein the reactive aspect of the responses from the second biometric information is characterized as fast or slow, wherein the reactive aspect is characterized as fast or slow based on a 90th percentile cutoff of an average response time to the plurality of calibration stimuli for the participant from among the multiple participants, wherein the reactive aspect is slow if the average response time is above the $90^{th}$ percentile and fast if the average response time is equal or below the $90^{th}$ percentile, and wherein the substantive aspect of the responses is characterized as positive or negative;

applying weights to the aggregated multiple participants' responses; and summing the weighted aggregated multiple participants' responses, thereby generating a response value initiative of the human response to the plurality of survey stimuli generated by the computer.

2. The survey method of claim 1, wherein the reactive aspect of the participant's response, to the calibration stimulus or the survey stimulus, comprises a response time.

3. The survey method of claim 1, wherein the calibration stimulus and the survey stimulus comprise questions.

4. The survey method of claim 1, wherein the calibration stimulus and the survey stimulus comprise images.

5. The survey method of claim 1, wherein the reactive aspect of the participant's response comprises a response time.

6. The survey method of claim 1, wherein:
the survey stimulus comprises a question; and wherein the survey method comprises:
  measuring the substantive aspect of the participant's response to the plurality of survey stimuli comprises recording the substantive aspect of the participant's response to the question.

7. The survey method of claim 1, wherein:
the survey channel is one of one or more survey channels, wherein an individual survey channel is capable of measuring the reactive aspect and the substantive aspect of a participant's response to the plurality of calibrating stimuli and/or the plurality of survey stimuli; and
the survey method further comprises:
presenting the multiple participants with the plurality of calibrating stimuli through the one or more survey channels;

measuring the reactive aspect of the multiple participants' responses to the plurality of calibrating stimuli through the one or more survey channels;

presenting the multiple participants with survey stimuli through the one or more survey channels;

measuring the reactive aspect and the substantive aspect of the multiple participants' responses to the plurality of survey stimuli through the one or more survey channels;

storing, in the electronic memory, the reactive aspect of the participant's response to the plurality of survey stimuli; and evaluating the reactive aspect, from the electronic memory, of the multiple participants' responses to the plurality of survey stimuli based on the reactive aspect of the multiple participants' responses to the plurality of calibrating stimuli, to generate evaluation results.

8. The survey method of claim 7, wherein the multiple participants' responses are aggregated by dividing the multiple participants' responses into groups based on the reactive and substantive aspects of the responses.

9. The survey method of claim 8, wherein the groups are based on discrete characterizations of the reactive and substantive aspects of the multiple participants' responses.

10. The survey method of claim 9, wherein:
the reactive aspect of the multiple participants' responses is characterized as fast or slow; and
the substantive aspect of the multiple participants' responses is characterized as positive or negative.

11. The survey method of claim 7, wherein:
the multiple participants' aggregated responses are arranged in a two-dimensional representation; and
the survey method further comprises transforming the two-dimensional representation to a one-dimensional representation.

12. The survey method of claim 7, further comprising:
storing the evaluation results in the electronic memory;
presenting the participant with at least one additional survey stimulus based on the reactive and substantive aspects of the participant's response to the survey stimulus; and
dynamically adjusting, in real time, the at least one additional survey stimulus based on the stored evaluation results.

13. The survey method of claim 12, wherein the at least one additional survey stimulus includes one or more survey questions, which are dynamically customized to the participant, wherein the survey method further comprises:
dynamically presenting the one or more survey questions, wherein the one or more survey questions include one or more images.

14. The survey method of claim 13, wherein the at least one additional survey stimulus includes one or more survey answers customized to the participant.

15. The survey method of claim 1, wherein the plurality of calibration stimuli and/or the plurality of survey stimuli comprises images.

* * * * *